United States Patent
Stephenson

(10) Patent No.: US 9,281,733 B2
(45) Date of Patent: Mar. 8, 2016

(54) SHUTTER WITH BISTABLE ACTUATOR HAVING POWER-FREE MAGNETIC BLADE RETURN

(75) Inventor: Stanley W. Stephenson, Spencerport, NY (US)

(73) Assignee: Melles Griot, Rochester, NY (US)

( * ) Notice: Subject to any disclaimer, the term of this patent is extended or adjusted under 35 U.S.C. 154(b) by 0 days.

(21) Appl. No.: 13/463,981

(22) Filed: May 4, 2012

(65) Prior Publication Data

US 2013/0187508 A1    Jul. 25, 2013

Related U.S. Application Data

(60) Provisional application No. 61/589,260, filed on Jan. 20, 2012.

(51) Int. Cl.
| | | |
|---|---|---|
| *H02K 21/14* | (2006.01) | |
| *H02K 1/14* | (2006.01) | |
| *G03B 9/10* | (2006.01) | |

(52) U.S. Cl.
CPC ...... *H02K 21/14* (2013.01); *G03B 9/10* (2013.01); *H02K 1/14* (2013.01)

(58) Field of Classification Search
USPC .............. 335/229, 272, 230, 234; 310/154.35
See application file for complete search history.

(56) References Cited

U.S. PATENT DOCUMENTS

| | | | | | |
|---|---|---|---|---|---|
| 1,222,431 | A | * | 4/1917 | McCarthy | 335/267 |
| 3,158,796 | A | * | 11/1964 | Musgrave | 335/230 |
| 3,434,082 | A | * | 3/1969 | Montagu | 335/229 |
| 3,604,330 | A | * | 9/1971 | Fahlenberg et al. | 396/455 |
| 3,694,782 | A | * | 9/1972 | Ray | 335/230 |
| 4,103,191 | A | * | 7/1978 | Kawamura et al. | 310/49.53 |
| 4,145,725 | A | * | 3/1979 | Wallis | 360/264.3 |
| 4,804,934 | A | * | 2/1989 | Finke et al. | 335/229 |
| 4,984,003 | A | * | 1/1991 | Matsumoto et al. | 396/463 |
| 4,985,652 | A | * | 1/1991 | Oudet et al. | 310/15 |
| 5,038,064 | A | * | 8/1991 | Fiorenza | 310/116 |
| 5,159,382 | A | * | 10/1992 | Lee et al. | 396/242 |
| 5,173,728 | A | * | 12/1992 | Sangregory et al. | 396/454 |
| 5,287,835 | A | * | 2/1994 | Fiorenza et al. | 123/352 |
| 5,334,893 | A | * | 8/1994 | Oudet et al. | 310/38 |
| 5,337,110 | A | * | 8/1994 | Dowe | 396/449 |
| 5,602,610 | A | * | 2/1997 | Akimoto et al. | 396/449 |
| 5,624,100 | A | * | 4/1997 | Bolte et al. | 251/65 |
| 5,742,106 | A | * | 4/1998 | Muraji | 310/36 |
| 6,123,468 | A | * | 9/2000 | Furlani et al. | 396/463 |
| 6,153,952 | A | * | 11/2000 | Ito et al. | 310/36 |
| 6,242,845 | B1 | * | 6/2001 | Colombo et al. | 310/317 |
| 6,472,967 | B1 | * | 10/2002 | Muraji | 335/229 |
| 6,476,701 | B1 | * | 11/2002 | Muraji | 335/220 |
| 6,733,192 | B2 | * | 5/2004 | Watanabe | 396/463 |
| 7,532,098 | B2 | * | 5/2009 | Spurr et al. | 335/229 |
| 2006/0163953 | A1 | * | 7/2006 | Kawamoto et al. | 310/49 R |
| 2007/0164640 | A1 | * | 7/2007 | Huang | 310/49 R |

* cited by examiner

*Primary Examiner* — Mohamad Musleh

(74) *Attorney, Agent, or Firm* — Steven R. Scott

(57) ABSTRACT

The instant invention teaches a monostable shutter with magnetic blade return using a bistable actuator with blade motion constrained to provide drive force in a single direction and permits the use of compact bistable coil for continuous use by a circuit that applies a high voltage at the beginning of drive that decays to a lower voltage to prevent coil burn out.

20 Claims, 3 Drawing Sheets

SHUTTER WITH BISTABLE ACTUATOR HAVING POWER-FREE MAGNETIC BLADE RETURN

CROSS-REFERENCE TO RELATED APPLICATIONS

This non-provisional application is based on and claims priority through my provisional application titled "Shutter with Bistable Actuator Having Power-Free Magnetic Blade Return" (Ser. No. 61/589,260) filed Jan. 20, 2012. The benefit under 35 USC §119(e) of this United States provisional application is hereby claimed, and the aforementioned application is hereby incorporated herein by reference.

BACKGROUND OF THE INVENTION

1. Field of the Invention

This invention pertains generally to optical shutters with bistable rotary drive actuators and shutters that move a blade to a given position when power is removed. More specifically, the invention (1) describes a monostable shutter with magnetic blade return using a bistable actuator and (2) permits the use of a compact bistable coil for continuous use while preventing coil burn out.

2. Description of the Related Art

Optical shutters use an actuator to drive a blocking element, "blade", between a first position that blocks a beam of radiation from passing through a designated open area (called an aperture) which serves as, or forms a pathway for the beam (or "beam path") and a second position that unblocks the beam of radiation, allowing the beam to traverse the beam path through the aperture. The radiation can be any form of electromagnetic radiation, such as ultra-violet, visible or infrared radiation. The aperture can be in a frame that is directly or indirectly coupled to the actuator The actuator can be electromagnetically activated (an "electromagnetic actuator") so that it responds to applied electrical power to move the blade between the open and closed position. An electromagnetic actuator can be a linear solenoid, a rotary solenoid, or a brushed or brushless commutated motor.

Monostable solenoid shutters comprise a coil of wire that provides a magnetic field when electrical power is applied. The magnetic field applies a force to pulls a soft magnetic core in a given direction. Monostable shutters with soft magnetic cores need a spring to returns the core to an original position when power is removed from the core. Monostable shutters arc useful in applications that require the blade to be in a given position when power is removed. Monostable shutters have the disadvantage that they require continuous power to remain in the electrically driven state.

Bistable shutters are stable in both the open and closed states when power is removed. Bistable shutters can be created using geared motor drives that lock in a given position when unpowered. An over-center spring can be used to create a locking force in either of the two positions. The soft magnetic core of a monostable solenoid can be replaced with a hard magnet that adheres to soft magnetic material in each of the two positions to create a bistable shutter. For example, the rotary drive solenoids (RDS) produced by CVI Melles-Griot are an example of rotary solenoids with a permanent magnet core that is bistable (ref Proc. of SPIE, Vol. 6542, "Advanced electro-mechanical micro-shutters for thermal infrared night vision imaging and applications; Durfee et al). These bistable shutters can have the advantage that the blade position changes with short pulses of voltage to drive the blade between positions. Because bistable shutters are pulsed intermittently, the coils are smaller and lighter to dissipate low amounts of energy over time. Such smaller coils burn out if subjected to continuous power.

Prior art examples that are or might be related to the technology and/or purposes of the instant invention include: (1) U.S. Pat. No. 4,868,695 issued to Quatro et al. for a "Head/Arm Lock Mechanism for a Disk Drive" (1989) describing a head/arm lock mechanism including a pawl mounted to the armature of a bistable solenoid; (2) U.S. Pat. No. 5,155,522 issued to Castor et al. for "Self Centering Bi-Directional Electromagnetic Actuator" (1992) describing a system for electromagnetically activating the shutter of a camera to provide different aperture openings; (3) U.S. Pat. No. 5,159,382 issued to Lee et al. for a "Device and Method for Electromagnetically Activating the Shutter of a Camera" (1992) describing a device and method for electromagnetically activating the shutter of a camera to provide different aperture openings; (4) U.S. Pat. No. 5,497,093 issued to Sundeen et al. for a "Method and Apparatus for Diagnosing a Twin-Coil, Bi-Stable, Magnetically Latched Solenoid" (1996) describing diagnosing the electrical and mechanical operation of a bistable magnetically latching solenoid by monitoring induced voltage across one of a pair of solenoid pairs not being energized; (5) U.S. Pat. No. 5,883,557 issued to Pawlak et al. for a "Magnetically Latching Solenoid Apparatus" (1999) describing a magnetically latching solenoid apparatus characterized by a non-magnetic armature carrying a permanent magnet having poles aligned with the throw axis of the device; and (6) U.S. Pat. No. 7,701,691 issued to Brundisini et al. for a "Control Device for Driving AC Solenoids and DC Bistable Solenoids, Specially for Electrovalves of Irrigation Systems" (2010) describing a control device to drive both AC solenoids and DC bistable solenoids. However, while the foregoing art examples and/or disclosures reveal a variety of forms and systems, none feature the unique combination of elements and advantages offered by the instant invention. More particularly, none disclose, anticipate or obviate a method to convert bistable shutters in monostable applications with blade return in the unpowered state, nor do any disclose, anticipate or obviate how bistable shutters with compact coils that burn out under continuous power can be used in monostable shutters.

SUMMARY OF THE INVENTION

It is an object of this invention to create a monostable shutter with magnetic blade return using a bistable actuator with blade motion constrained to provide drive force in a single direction. It is a further object of the invention to permit the use of compact bistable coil for continuous use by a circuit that applies a high voltage at the beginning of drive that decays to a lower voltage to prevent coil burn out. These objects are accomplished by providing a shutter with blade return on power down comprising: a) a frame with an aperture; b) a bistable actuator with magnetic drive and retention; c) a rotating magnet in said actuator having a magnetic field operable between two angular positions; d) a soft magnet stator arm positioned so that said magnet is attracted to one of two positions to secure said rotating magnet into one of the two rotational positions; c) a blade coupled to said rotating magnet in said actuator having detail to define a first position to cover said frame aperture and a second position to clear said frame aperture, said detail providing two angular positions for said rotating magnet to drive said blade to one position over said frame aperture. The apparatus further includes an electromagnetic coil drive for forcibly driving said rotating magnet and coupled blade to an position that uncovers said frame aperture; means for lowering drive voltage across said coil over time after an fixed voltage has been applied to said coil, which means can advantageously comprise a resistor and capacitor.

DESCRIPTION

Figure 1:
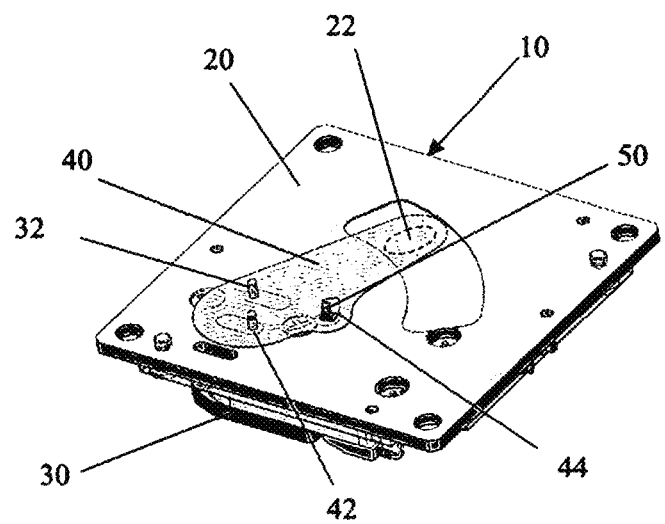
FIG. 1 provides a schematic top perspective view of a shutter in accordance with the teachings of the invention.
Figure 2:
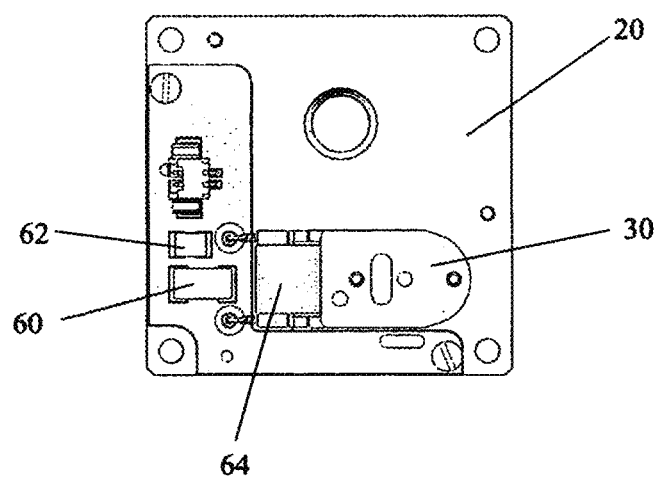
FIG. 2 provides a schematic bottom view of the shutter in accordance with the teachings of the invention.
Figure 3:
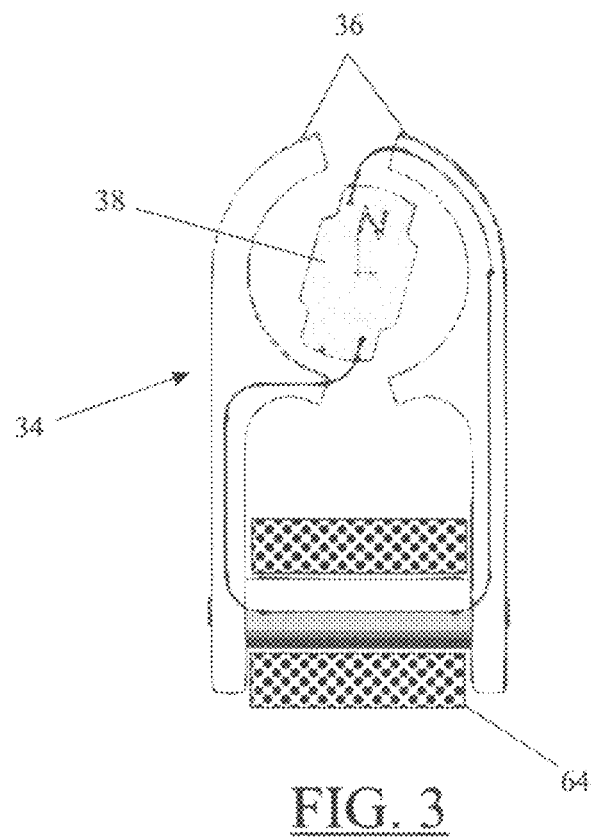
FIG. 3 provides a schematic cross-sectional view of an actuator in accordance with the teachings of the invention.

FIGS. 1 through 3, provide a basic schematic introduction to the structure of the invention. As illustrated in FIGS. 1 and 2, shutter 10 comprises a frame 20 having an aperture 22 and supporting an actuator 30 that is connected to a blade 40 driven by drive pins 32 from actuator 30 via blade holes 42 in a manner typical in the art. A stop detail of frame 20 such as, e.g., stop pin 50 projects from frame 20 and operates on a stop detail of blade 40 such as, e.g., stop opening 44 in blade 40. As better seen in FIG. 3, actuator 30 has a stator assembly 34 made of low magnetic coercivity metal that conducts a magnetic field. Rotor magnet 38 is connected to drive pins 32, is pivotally mounted, and will be magnetically attracted to stator arms 36. Rotor magnet 38 is a permanent magnet that will move in an opposite direction to a magnetic flux induced in stator assembly 34. A coil 64 is wrapped around stator assembly 34 in the manner typical of the art such that an applied voltage to coil 64 creates a magnetic field that drives rotor magnet 38 away from one position and into the opposing position.

Drive pins 32 are connected to rotor magnet 38 and interact with/drive blade 40 via their movement in blade holes 42. Absent stops or controls, rotor magnet 38 and blade 40 will switch between two stable positions based on the direction of current flow through coil 64. However, the degree and direction of rotation of rotor magnet 34 as well as coupled blade 40 is controlled by stop opening 44 in blade 40 being driven against stop pin 50 due to the previously described linkage of blade 40 to rotor magnet 34 via drive pins 32 and blade holes 42. In the preferred embodiments illustrated, as more fully explained below, these limit rotor magnet 38 to motion between a 30 degree position and a 10 degree position (both measured relative, in terms of FIG. 3, to a vertical position defined as 0 degrees), with the 30 degree position corresponding to the blade 40 position occluding aperture 22 (as shown in FIG. 1) and the 10 degree position corresponding to a blade 40 position exposing aperture 22.

Figure 4:
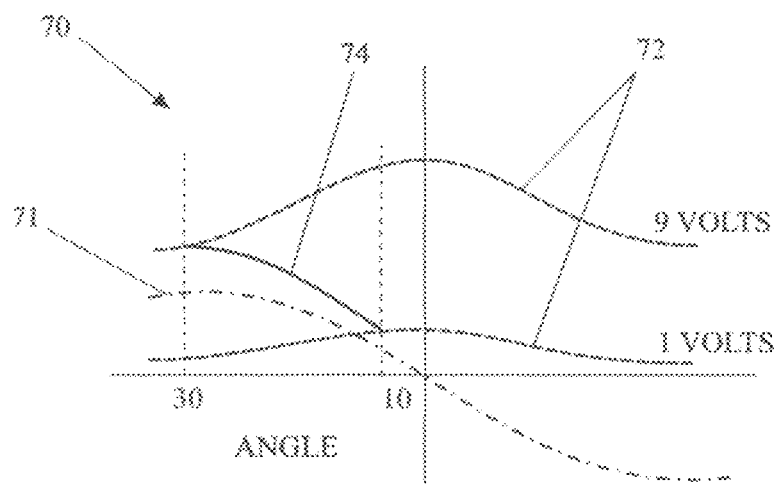
FIG. 4 is a plot of torque on the blade as a function of blade angle in the invention.

The foregoing can be better explained and understood by reference to FIG. 4, which provides a plot 70 of torque on blade 40 as a function of blade 40 angle. The zero degree angle is defined as rotor magnet 38 positioned between stator arms 36 so as to be oriented towards neither. Hold curve 71 plots the magnetic force driving blade 40 as a function of blade 40 angle. When rotor magnet 38 is at zero angle the rotational force from the magnetism in rotor magnet 38 is balanced and there is no force rotating blade 40. When rotor magnet 32 is rotated close to one of the two stator arms 36, retention force increases and drive force decreases. (See, hold curve 71).

When an electrical current is applied to coil 64 of stator assembly 34, it forms a magnetic flux interacting with the field from the permanent magnet 38. In the invention, the current applied and resultant magnetic flux is oriented so as to work against the flux from rotor magnet 38, driving it from its first stopped position at 30 degrees towards 0 degrees. Drive curves 72 are plotted as a function of the angle with various voltages applied to coil 64 in FIG. 4. As illustrated by drive curves 72 in FIG. 4, the force is at its peak at the zero degree angle and decays as rotor magnet moves away from 0 angle. As further illustrated by FIG. 4, drive force (shown by drive curve 72) must be greater than retention force (shown by hold curve 71) in order to drive rotor magnet 34 from its locked/blocked position at 30 degrees. In the example plot, 9 volts provides greater torque than holding torque 71, and one volt does not. Thus, the voltage used for the invention must be chosen to achieve this purpose.

As previously noted, in the exemplary embodiment of the invention illustrated, the stop detail/opening 44 in blade 40 is designed (in conjunction with stop pin 50) to constrain blade motion to one side of torque curve 70 between the 30 degree (first position) and 10 degree (second position). Blade 40 is continuously forced or biased to the far side of the curve (the 30 degree/first position) in accordance with the static magnetic forces delineated in hold curve 71 in its unpowered state. (In safety applications, this is a critical consideration, as it is important that blade 40 close aperture 22 in an unpowered state). The bistable actuator 30 can be pulsed for short periods of time to move the blade from the first position to the second position. The duty cycle of the pulsing is such that the coil is typically undersized for continuous operation. An undersized coil will burn out if continuous voltage is applied. In the invention, decay means is added to shutter 10 to provide a high initial drive voltage when blade 40 is in an initial 30 degree position and the drive voltage decays over time. Decay curve 74 in the exemplary embodiment provides a high, 9 volt, power to the coil initially, and decays applied voltage to 1 volt after the blade has move to the open 10 degree angle, allowing static magnetic forces to once again move rotor magnet 38 so as to urge shutter 10 back to the first (30 degree) position occluding aperture 22.

Figure 5:
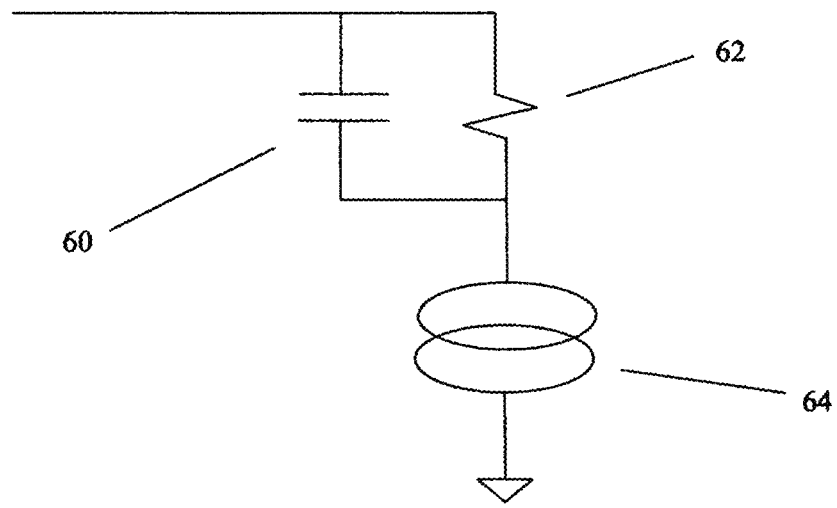
FIG. 5 is a circuit that provides a decay drive voltage in accordance with the teachings of the invention.

FIG. 5 is a circuit that provides a decay drive voltage in the application. A capacitor 60 and resistor 62 are configured as shown to permit an initial high voltage to decay to a lower voltage. Coil 64 has a high inductance that appears to be open initially. The full drive voltage is applied against coil 4 initially. Capacitor 60 is at zero voltage and shorts out resistor 62. As field builds in capacitor 60, voltage develops across resistor 62 to drop voltage across coil 64. The components are small enough to be parts of shutter 10, as shown in FIG. 2. The values for the three electrical elements are sized based on the dynamic motion of blade 40. In an example embodiment, coil 64 is 40 ohms and resistor 62 is 200 ohms and capacitor 60 is 100 micro-farads. When nine volts is applied across the circuit, the voltage across coil 64 starts at 9 volts and decays to 1.5 volts after 10 milliseconds. Blade 40 moves within the 10 milliseconds from a 30 degree to 10 degree angle. The final drive voltage is below the voltage required to start blade 40 motion and is low enough to prevent coil 64 from burning out over long operating times. The components required to create the circuit in FIG. 5 are small enough to be disposed on a circuit board attached to shutter 10 as shown in FIG. 3, creating a compact shutter system with a bistable actuator that has magnetic blade return on power down.

The invention has been described in detail with particular reference to certain preferred embodiments thereof. However, it should be clear that numerous changes and variations can be made without exceeding the scope of the inventive concept outlined. Accordingly, it is to be understood that the embodiment of the invention herein described is merely illustrative of the application of the principles of the invention. Reference herein to details of the illustrated embodiment is not intended to limit the scope of the claims, which themselves recite those features regarded as essential to the invention.

PARTS LIST 10 shutter
20 frame
22 aperture
30 actuator
32 drive pins
34 stator assembly
36 stator arm
38 rotor magnet
40 blade
42 blade holes
44 stop opening
50 stop pin
60 capacitor
62 resistor
64 coil
70 torque curve
71 hold curve
72 drive curve
74 decay curve

What is claimed is:

1. An electromagnetic radiation shutter with blade return on power down comprising:
   a) a frame with an aperture, which aperture forms a beam path for said electromagnetic radiation;
   b) a bistable actuator with magnetic drive and retention;
   c) a rotating magnet in said actuator having a magnetic field operable between two angular positions;
   d) a soft magnet stator arm positioned so that said magnet is attracted to one of two positions to secure said rotating magnet into one of the two rotational positions; and
   e) a blade coupled to said rotating magnet in said actuator having a stop detail interacting with a stop detail of said frame to define a first position to cover said frame aperture so as to block said beam path and prevent a beam of electromagnetic radiation from traversing said aperture and a second position to at least one of completely clear said frame aperture so as to completely unblock said beam path and allow said beam to traverse said aperture, and clear said frame aperture sufficiently to completely unblock a central portion of said beam path and allow said beam to traverse said central portion, said stop details providing two angular positions for said rotating magnet to drive said blade to over said frame aperture.

2. The apparatus of claim 1 wherein said stop details are comprised of a stop pin interacting with a stop opening.

3. The apparatus of claim 2 wherein said stop pin projects from the frame and said stop opening is in the blade.

4. The apparatus of claim 1, wherein said apparatus includes mechanical stops in association with the blade to define two mechanically stable states and also includes a continuously biased return force.

5. The apparatus of claim 1 including an electromagnetic coil drive for forcibly driving said rotating magnet and coupled blade to a position that uncovers said frame aperture and means that lowers drive voltage across said coil over time after an fixed voltage has been applied to said coil wherein at least one of: said voltage lowering means is a resistor and capacitor, and said voltage lowering means is attached to said shutter frame.

6. A bistable actuator for electromagnetic radiation shutter actuation, comprising:
   a stator assembly having two stator arms forming opposing stator poles;
   a conducting coil mounted around some portion of said stator assembly such that electric current in said coil will produce an electrically driven magnetic field between said two opposing stator poles;
   a permanent magnet having magnet poles producing a permanent magnet field, which magnet is rotatably mounted between said opposing stator poles so as to rotate to and maintain a first position relative to said opposing stator poles due to said permanent magnet field when no current is applied to said conducting coil, and to rotate to a second position relative to said opposing stator poles due to said electrically driven magnetic field when current is applied to said conducting coil;
   wherein a stop detail of said frame interacts with a stop detail of said shutter to limit motion of said permanent magnet to movement between said first position and said second position; and
   a beam path for electromagnetic radiation, which beam path is blocked when said permanent magnet is in the first position and opened when said permanent magnet is in the second position.

7. The bistable actuator for shutter actuation of claim 6, further comprising a frame with an aperture and a shutter blade linked to said permanent magnet so as to occlude said aperture when said permanent magnet is in the first position and to expose said aperture when said permanent magnet is in the second position.

8. The bistable actuator for shutter actuation of claim 7, wherein said stop details are comprised of a stop pin interacting with a stop opening to limit motion of said permanent magnet to movement between said first position and said second position.

9. The bistable actuator for shutter actuation of claim 7, wherein said first position is at approximately 30 degrees and said second position is at approximately 10 degrees, where 0 degrees is defined by a line equidistant from and between said two opposing stator poles.

10. The bistable actuator for shutter actuation of claim 8, wherein said first position is at approximately 30 degrees and said second position is at approximately 10 degrees, where 0 degrees is defined by a line equidistant from and between said two opposing stator poles.

11. The bistable actuator for shutter actuation of claim 6, wherein the current applied to said conducting coil takes the form of an electrical pulse, which electrical pulse causes a repulsive force between said magnet poles and adjacent stator poles that is temporarily strong enough to overcome said permanent magnet attraction to said poles so as to temporarily cause said permanent magnet to move from the first to the second position, temporarily driving said shutter from a position occluding said aperture to a position exposing said aperture.

12. The bistable actuator for shutter actuation of claim 11, further including an electrical circuit that lowers drive voltage across said coil over time after a fixed voltage has been applied to said coil to form said electrical pulse.

13. The bistable actuator for shutter actuation of claim 12, wherein said voltage lowering circuit includes a resistor and capacitor in parallel.

14. A bistable actuator for electromagnetic radiation shutter actuation, comprising:
- a stator assembly having two stator arms forming opposing stator poles;
- a conducting coil mounted around some portion of said stator assembly such that electric current in said coil will produce an electrically driven magnetic field between said two opposing stator poles;
- a permanent magnet having magnet poles producing a permanent magnet field, which magnet is rotatably mounted between said opposing stator poles so as to rotate to and maintain a first position relative to said opposing stator poles due to said permanent magnet field when no current is applied to said conducting coil, and to rotate to a second position relative to said opposing stator poles due to said electrically driven magnetic field when current is applied to said conducting coil;
- a frame with an aperture forming an electromagnetic radiation beam path and a shutter blade linked to said permanent magnet so as to occlude said aperture so as to block said beam path and prevent a beam of electromagnetic radiation from traversing said aperture when said permanent magnet is in the first position and to expose said aperture so as to unblock said beam path and allow said beam to traverse said aperture when said permanent magnet is in the second position;
- wherein the current applied to said conducting coil takes the form of an electrical pulse, which electrical pulse causes a repulsive force between said magnet poles and adjacent stator poles that is temporarily strong enough to overcome said permanent magnet attraction to said poles so as to temporarily cause said permanent magnet to move from the first to the second position, temporarily driving said shutter from a position occluding said aperture to a position exposing said aperture; and
- wherein a stop detail of said frame interacts with a stop detail of said shutter to limit motion of said permanent magnet to movement between said first position and said second position.

15. The bistable actuator for shutter actuation of claim 14, wherein said first position is at approximately 30 degrees and said second position is at approximately 10 degrees, where 0 degrees is defined by a line equidistant from and between said two opposing stator poles.

16. The bistable actuator for shutter actuation of claim 14, further including an electrical circuit that lowers drive voltage across said coil over time after a fixed voltage has been applied to said coil to form said electrical pulse.

17. The bistable actuator for shutter actuation of claim 15, further including an electrical circuit that lowers drive voltage across said coil over time after a fixed voltage has been applied to said coil to form said electrical pulse.

18. The bistable actuator for shutter actuation of claim 16, wherein said voltage lowering circuit includes a resistor and capacitor in parallel.

19. The bistable actuator for shutter actuation of claim 17, wherein said voltage lowering circuit includes a resistor and capacitor in parallel.

20. The bistable actuator for shutter actuation of claim 19, wherein said stop details are comprised of a stop pin interacting with a stop opening.

* * * * *